(12) United States Patent
Friedmann

(10) Patent No.: US 12,744,976 B2
(45) Date of Patent: Sep. 22, 2026

(54) SYSTEM AND METHOD FOR TRIGGERING COUNTDOWN ON DIGITAL USER INTERFACE

(71) Applicant: DD Traders, Inc., Leawood, KS (US)

(72) Inventor: Peter Friedmann, Leawood, KS (US)

(73) Assignee: DD Traders, Inc., Leawood, KS (US)

( * ) Notice: Subject to any disclaimer, the term of this patent is extended or adjusted under 35 U.S.C. 154(b) by 118 days.

(21) Appl. No.: 18/463,455

(22) Filed: Sep. 8, 2023

(65) Prior Publication Data

US 2024/0089566 A1 Mar. 14, 2024

Related U.S. Application Data

(60) Provisional application No. 63/404,807, filed on Sep. 8, 2022.

(51) Int. Cl.
*H04N 21/658* (2011.01)
*H04N 21/239* (2011.01)
(Continued)

(52) U.S. Cl.
CPC ..... *H04N 21/8586* (2013.01); *H04N 21/2393* (2013.01)

(58) Field of Classification Search
None
See application file for complete search history.

(56) References Cited

U.S. PATENT DOCUMENTS

D592,541 S 5/2009 Chen
D601,057 S 9/2009 Chen
(Continued)

FOREIGN PATENT DOCUMENTS

CN 105898500 A 8/2016
WO 2020/145925 7/2020
(Continued)

OTHER PUBLICATIONS

Clouse, Sarah, ClouseCrafts, Santa Tracker Ornament SVG, QR Code Santa Tracker Ornament SVG, Engraved Christmas Santa Tracker Ornament, Kids Christmas Ornament svg, Webpage <https://www.etsy.com/listing/1123747134/santa-tracker-ornament-svg-qr-code-santa>, Sep. 5, 2023, 2 pages.
(Continued)

*Primary Examiner* — Brian T Pendleton
*Assistant Examiner* — Jean D Saint Cyr
(74) *Attorney, Agent, or Firm* — HOVEY WILLIAMS LLP

(57) ABSTRACT

A computer-implemented method for providing unique content associated with a product includes providing a URL encoded in a QR code operatively associated with the product; receiving a request with an IP address and data regarding previously viewed videos from a user device; determining a geographic location of the user device based on the IP address; determining a user time zone based on the geographic location; selecting videos stored on a content database based on the user time zone; generating a substantially random order for displaying the videos; determining a selected video based on the substantially random order and the data regarding previously viewed videos; and transmitting the selected video to the user.

8 Claims, 2 Drawing Sheets

Figure 1:
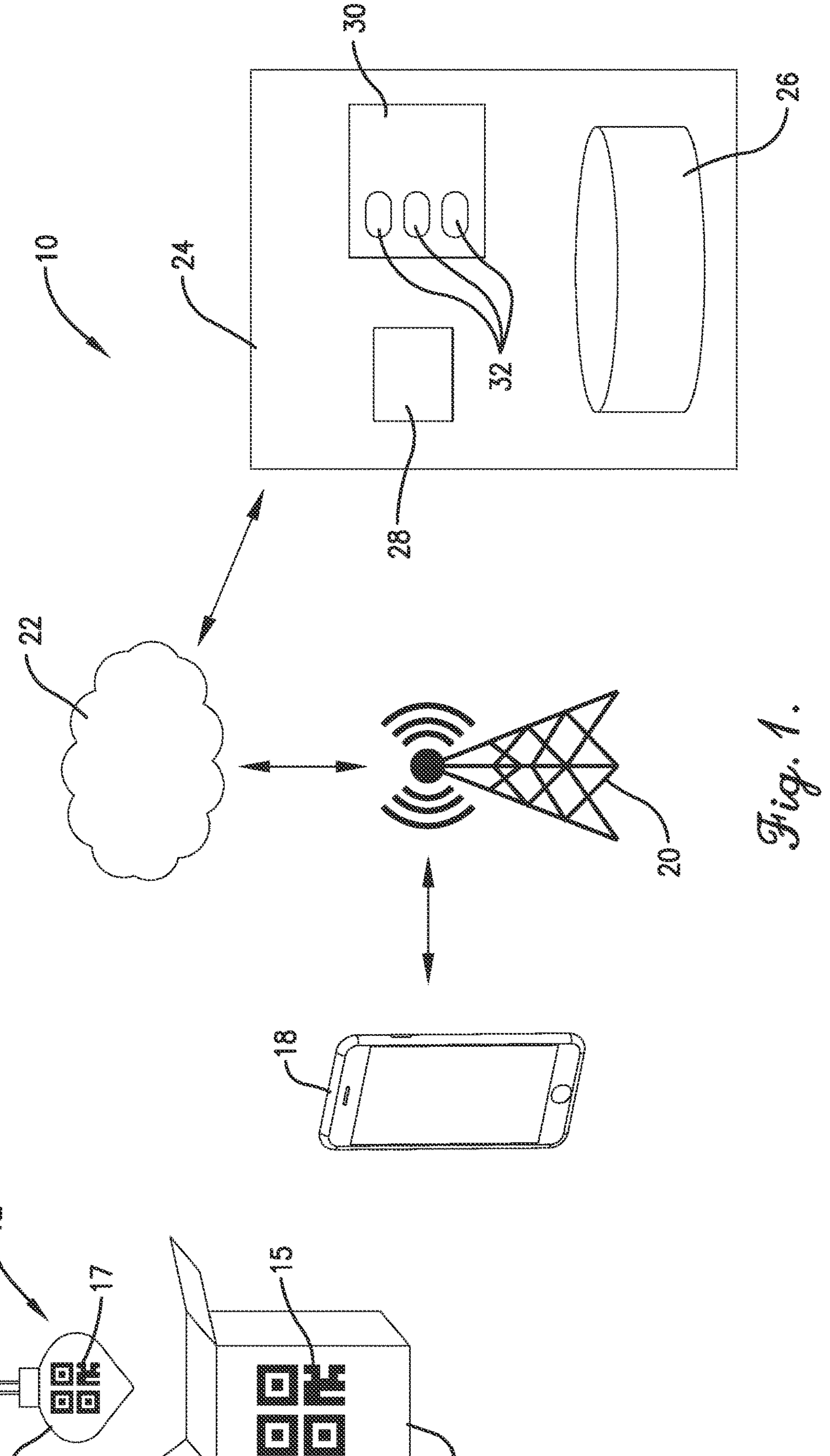

(51) Int. Cl.

| | |
|---|---|
| ***H04N 21/258*** | (2011.01) |
| ***H04N 21/262*** | (2011.01) |
| ***H04N 21/81*** | (2011.01) |
| ***H04N 21/858*** | (2011.01) |

(56) References Cited

U.S. PATENT DOCUMENTS

| | | | | |
|---|---|---|---|---|
| D609,601 | S | 2/2010 | Chen | |
| 8,272,562 | B2 | 9/2012 | Ziegler | |
| 8,651,370 | B1 | 2/2014 | Mudrick et al. | |
| 8,919,639 | B2 | 12/2014 | Leinicke | |
| 9,805,356 | B2 | 10/2017 | Jewell et al. | |
| 9,894,423 | B1 * | 2/2018 | Spencer | H04N 21/812 |
| 9,898,465 | B2 | 2/2018 | Hoffman et al. | |
| 9,946,963 | B2 | 4/2018 | Samara et al. | |
| 10,325,529 | B1 | 6/2019 | Kuhn | |
| 10,607,052 | B2 | 3/2020 | Broselow | |
| 11,615,454 | B2 | 3/2023 | Mueller | |
| 2002/0018074 | A1 * | 2/2002 | Buil | G11B 27/002 725/38 |
| 2008/0240687 | A1 | 10/2008 | Kim et al. | |
| 2012/0292383 | A1 * | 11/2012 | Leinicke | G09B 5/062 235/375 |
| 2013/0132169 | A1 | 5/2013 | Dooley et al. | |
| 2013/0175335 | A1 * | 7/2013 | Roberts | G06F 16/73 235/375 |
| 2014/0304247 | A1 * | 10/2014 | Fastlicht | G06F 16/40 707/706 |
| 2015/0358261 | A1 * | 12/2015 | Ko | H04L 51/10 709/206 |
| 2016/0164958 | A1 * | 6/2016 | Sharan | H04L 63/0876 709/217 |
| 2021/0127165 | A1 | 4/2021 | Dang et al. | |
| 2021/0211313 | A1 | 7/2021 | Shaffer | |
| 2022/0047047 | A1 | 2/2022 | Cheng | |
| 2022/0309311 | A1 | 9/2022 | Niekamp et al. | |

FOREIGN PATENT DOCUMENTS

| | | |
|---|---|---|
| WO | 2020/252280 | 12/2020 |
| WO | 2021/021065 | 2/2021 |
| WO | 2022/090961 | 5/2022 |
| WO | 2022217261 | 10/2022 |

OTHER PUBLICATIONS

Denso Wave Incorporated, QR Codes on Product Packaging, Webpage <https://www.qr-code-generator.com/qr-codes-on/product-packaging/>, 2023, 13 pages.

Google, Santa Tracker, Webpage <https://santatracker.google.com/>, 1 page.

International Search Report and Written Opinion in related PCT Application PCT/US2023/032258 mailed Dec. 8, 2023, 14 pages.

* cited by examiner

SYSTEM AND METHOD FOR TRIGGERING COUNTDOWN ON DIGITAL USER INTERFACE

RELATED APPLICATIONS

The present application is a non-provisional application and claims priority benefit of provisional application entitled "SYSTEM AND METHOD FOR TRIGGERING COUNTDOWN ON DIGITAL USER INTERFACE", Ser. No. 63/404,807, filed on Sep. 8, 2022, the content of which is hereby incorporated in its entirety by reference herein.

BACKGROUND

Products, such as ornaments, packaging, and displays often include references to social media or websites in which promotional content is provided. However, finding the exact social media accounts or websites intended to be referred to by the references often requires research time. Further, fake accounts and promoted websites of competitors often lead a consumer to an unintended destination. Additionally, the content provided is often limited by the parameters of social media platforms. The content is often static in that it is the same content for every use.

The background discussion is intended to provide information related to the present invention which is not necessarily prior art.

SUMMARY

The present invention solves the above-described problems and other problems by providing methods and systems for curating unique content based on a countdown to a predefined date.

Some implementations herein relate to a method. For example, computer-implemented method may include providing a quick response (QR) code operatively associated with a product, where the QR code has encoded therein a uniform resource locator (URL) of a website. Computer-implemented method may also include receiving, via one or more servers, a request from a user device, the request including user device data including an internet protocol (IP) address and one or more identifier of any previously viewed video content file. The method may furthermore include determining, via the one or more servers, an approximate geographic location of the user device based at least in part on the IP address. The method may in addition include determining, via the one or more servers, an approximated user time zone based at least in part on the approximate geographic location. The method may moreover include selecting, via the one or more servers, a plurality of video content files stored on a content database operatively associated with the one or more servers based at least in part on the approximated user time zone. The method may also include generating, via the one or more servers, a substantially random order for displaying the plurality of video content files. The method may furthermore include determining, via the one or more servers, a selected video content file of the plurality of video content files based at least in part on the substantially random order and the one or more identifier of any previously viewed video content file. The method may in addition include transmitting, via the one or more servers, the selected video content file. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, system may include a product having associated therewith a quick response (QR) code with a uniform resource locator (URL) of a website encoded in the QR code. The system may also include one or more servers operatively associated with the website, the one or more servers including a content database and being configured to: receive a request from an user device, where the request includes user device data including an internet protocol (IP) address and one or more identifier of any previously viewed video content file, determine an approximate geographic location of the user device based at least in part on the IP address, determine an approximated user time zone based at least in part on the approximate geographic location, select a plurality of video content files stored on the content database based at least in part on the approximated user time zone, generate a substantially random order for displaying the plurality of video content files, determine a selected video content file of the plurality of video content files based at least in part on the substantially random order and the one or more identifier of any previously viewed video content file, and transmit the selected video content file. Other embodiments of this aspect include corresponding computer systems, apparatus, and computer programs recorded on one or more computer storage devices, each configured to perform the actions of the methods.

Some implementations herein relate to a method. For example, computer-implemented method may include providing a quick response (QR) code operatively associated with a product, where the QR code has encoded therein a uniform resource locator (URL) of a website. Computer-implemented method may also include receiving, via one or more servers, a request from a user device. The method may furthermore include transmitting, via the one or more servers, a request for user data including data indicative of a user time zone and an unique user identifier. The method may in addition include receiving, via the one or more servers, the user data. The method may moreover include selecting, via the one or more servers, a plurality of video content files stored on a content database operatively associated with the one or more servers based at least in part on the user time zone. The method may also include generating, via the one or more servers, a substantially random order for displaying the plurality of video content files. The method may furthermore include storing, via the one or more servers, the substantially random order in association with the unique user identifier on a user database. The method may in addition include determining, via the one or more servers, a selected video content file of the plurality of video content files based at least in part on the substantially random order. The method may moreover include transmitting, via the one or more servers, the selected video content file. The method may also include storing, via the one or more servers, an identifier of the selected video content file in association with the unique user identifier on the user database. Other embodiments of this aspect include corresponding computer systems, apparatus, and computer programs recorded on one or more computer storage devices, each configured to perform the actions of the methods.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
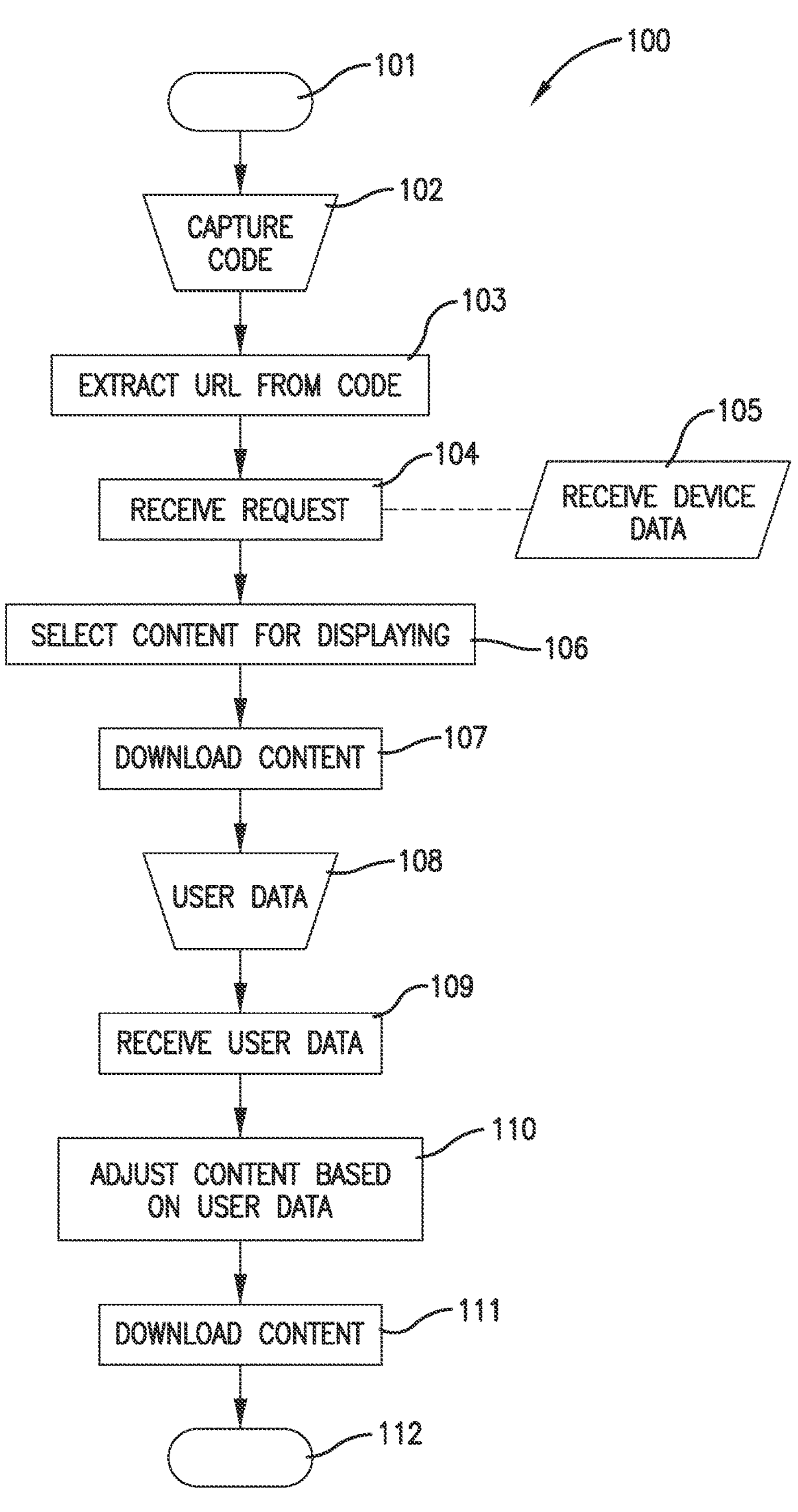

Embodiments of the present invention are described in detail below with reference to the attached drawing figures, wherein:

FIG. 1 block diagram depicting selected components of a system according to an embodiment of the present invention; and FIG. 2 is a flowchart depicting exemplary steps of a method according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a system 10 in which embodiments of the invention may be implemented is illustrated. The system 10 comprises a product 12, a user device 18, a communication network 22, and one or more servers 24 for hosting a website. The product 12 may include packaging 14 in which the good or merchandise 16 is packaged. The packaging 14 may include, but is not limited to: standard retail boxes, blister packs, clamshell containers, shrink wrap, poly bags, tubes, barrels, drums, crates, envelopes, bubble mailers, and/or pallets. The packaging material may be composed of various substances such as cardboard, plastic, metal, glass, or any combination thereof. In certain embodiments, the packaging 14 may be designed to include a window or clear portion for visual inspection of the product, or it may be entirely opaque.

The packaging 14 and/or materials included with the packaging 14 may have printed or otherwise disposed thereon, a packaging code 15. A uniform resource locator (URL) of a website is encoded in the code 15 and may include a destination page or requested page (or a portion thereof) for the website. In one or more embodiments, the URL is for a demonstration page on the website, as discussed in further detail below. In one or more embodiments, the code 15 comprises a quick response (QR) code, a bar code, augmented reality (AR) or virtual reality (VR) markers, near field communication (NFC) tags, radio frequency identification (RFID) tags, and/or an encoded image. AR and VR markers can be created in various formats without departing from the scope of the present invention. NFC tags can be invisibly embedded into physical objects or packaging and can communicate automatically with smartphones in close proximity, providing a seamless and effortless data transfer experience.

In one or more embodiments, the merchandise 16 comprises an ornament, such as a holiday or Christmas ornament and a product code 17 printed or otherwise disposed thereon. Similar to the packaging code 15, the product code 17 may comprise a QR code, a bar code, an AR or VR marker, an NFC tag, an RFID tag, and/or an encoded image. A URL of the website is also encoded in the code 17 and may likewise include a destination page or requested page (or a portion thereof) for the website. In one or more embodiments, the URL is for a main page on the website, as discussed in further detail below, which is separate or different than the demonstration page.

The user device 18 includes a camera or other sensor configured to capture the codes 15, 17 and extract the encoded URLs from the codes 15, 17. The user device 18 may have operating thereon image recognition software, computer vision, or the like, or other applications known in the art for detecting the codes 15, 17 and extracting the encoded URLs. The user device 18 may be configured to sense and interpret various elements within the image, such as shapes, colors, patterns, and even specific objects or faces. The user device 18 may also include one or more communication elements, one or more memory elements, one or more processor elements, and a user interface, which are defined below. The user device 18 may include stored thereon an internet browser application for entering one or both of the URLs and sending a request, such as an internet protocol request or a hypertext transfer protocol request, through the network 22 to the one or more servers 24. The user device 18 may be in wired or wireless communication with the one or more servers 24 through the network 22. For example, the user device 18 may be wired or wirelessly connected to the network 22 via a wireless network 20, such as a cellular network and/or a WiFi network. The user device 18 may include but is not limited to smartphones, tablets, smartwatches, smart TVs, laptop computers, desktop computers, wearable devices, AR and/or VR headsets, or the like.

As used herein, "communication element" is any device that generally allows communication with systems or devices within and/or external to the device. The communication element may include signal or data transmitting and receiving circuits, such as antennas, amplifiers, filters, mixers, oscillators, digital signal processors (DSPs), and the like. The communication element may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element may be in communication with the processing element and the memory element.

The memory element may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a "computer-readable medium". The memory element may store the instructions, code, code segments, software, firmware, programs, applications, apps, services, daemons, or the like that are executed by the processing element.

The user interface generally allows the user to utilize inputs and outputs to interact with the device and is in communication with the processing element. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention may include a display and/or any number of additional outputs, such as audio speakers, lights, dials, meters, printers, or the like, or combinations thereof, without departing from the scope of the present invention.

The processing element may include processors, microprocessors (single-core and multi-core), microcontrollers, DSPs, field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. The processing element may be in communication with the other electronic components through serial or parallel links that include address buses, data buses, control lines, and the like.

The network 22 includes any interconnected system or collection of devices, either wired or wireless, that facilitates the exchange, transmission, or reception of data or information via the internet. This includes, but is not limited to, routers, modems, servers, and other communication infrastructure. These devices may utilize various technologies and protocols, such as Ethernet, Wi-Fi, fiber optics, 3G, 4G, 5G, and beyond, to enable connectivity and communication between different devices and systems across diverse geographical locations. This network 22 can be utilized for various purposes, including but not limited to, data sharing, uploading data, downloading data, internet browsing, etc.

The one or more servers 24 are configured to host the website. The one or more servers 24 may similarly include one or more communication elements, one or more memory elements, and one or more processor elements, as defined above. Particularly, the one or more servers may include a database 26, a random number generator 28, and content controller 30. The database 26 includes a plurality of digital files, including audio-video files (or "video content files"), audio files, text files, etc. In one or more embodiments, the database 26 includes video content files containing videos related to a countdown to a particular day. Particularly, the database 26 may include a plurality of videos for each of a number of days until the particular day. For example, the database 26 may include a plurality of videos for each of the thirty days before Christmas day. The database 26 may store the plurality of video content files in association with the particular number of days remaining until Christmas day. Further, the database 26 may include a number of demonstration videos. The demonstration videos may be excerpts of the plurality of videos unique videos. In one or more embodiments, the database 26 may similarly store the plurality of demonstration video content files in association with the particular number of days remaining until Christmas. For example, in one or more embodiments, the video content files (demonstration videos or regular videos) stored on the content database include classifiers associated with a number of days remaining until a predefined date, such as Christmas day.

The random number generator 28 may include any algorithm, process, mathematical formula, or other computational device configured to generate a sequence of numbers or symbols that substantially lack pattern, i.e., the numbers are substantially not predictable. As used herein, "substantially random" includes any sequence that is completely random or pseudorandom. The random number generator 28 may produce the sequence in a deterministic or a non-deterministic way.

The content controller 30 is configured to receive the request from the user device 18 through the network 22 and provide content 32 based on the request. The request may include user device data, including an internet protocol (IP) address, cookies, such as one or more identifier of any previously viewed video content file, a page requested, or the like. The content controller 30 is configured to determine an approximate geographic location of the user device 18 based at least in part on the IP address. The content controller 30 is configured to determine an approximated user time zone based at least in part on the approximate geographic location.

The content controller 30 is configured to select a plurality of video content files 32 stored on the content database 26 based at least in part on the approximated user time zone of the user device 18. For example, the content controller 30 may determine that there are a number of days remaining until the predefined date and pull the video content files 32 from the database 26 that in classifications with that number of days remaining. As a further example, the content controller 30 may determine that in the approximate time zone, there is only one day remaining until Christmas day. Thus, the content controller 30 may be configured to pull videos classified with 1 day remaining, or characterized as Christmas Eve video content files.

The content controller 30 may also be configured to select the plurality of video content files stored on the content database based at least in part on the page requested included in the request. For example, in one or more embodiments, when the packaging code 15 is captured by the user device 18, a URL to a demonstration page of the website is entered into the browser of the device 18. Therefore, the page requested included in the request to the server(s) 24 indicates the demonstration page. The content controller 30 may then pull from the database 26 a plurality of video content files 32 classified with a number of days remaining until the predefined date and/or classified as demonstration video content files.

Once the video content files 32 have been pulled from the database 26, the content controller 30 is configured to present them in a substantially random order. For example, the content controller 30 may be configured to request a number of substantially random numbers from the random number generator 28 and assign the random number to the video content files 32. The content controller 30 may then be configured to order the video content files 32 for transmitting according to their assigned random numbers.

The content controller 30 may be configured to determine or select one or more selected video content files 32 for viewing via the user device 18 from the plurality of video content files 32. The content controller 30 may select one of the video content files 32 based at least in part on the substantially random order.

In one or more embodiments, the content controller 30 may be configured to determine whether one or more of the video content files 32 have already been viewed by the user device 18. For example, the content controller 30 may be configured to use cookies to determine one or more identifier of any previously viewed video content file 32 and/or which video content file 32 is next according to the substantially random order. The request to the server 24 may include a cookie, such as a text file, indicating one or more previously viewed video content files 32. The content controller 30 may be configured to compare the identifier of any previously viewed video content file 32 with an identifier of a video content file 32 of the plurality of video content files 32 at a beginning of the substantially random order and determine that they match. The content controller 30 may then compare the identifier of any previously viewed video content file with an identifier of a subsequent video content file 32 in the substantially random order.

Once the video content file 32 is selected for viewing by the particular user device 18, the content controller 30 may be configured to transmit the page (main page or demonstration page) to the content controller 30. This may include transmitting the selected video content file 32 to the user device 18 via the network 22.

In one or more embodiments, upon receiving the request, the one or more servers 24 are configured to transmit a request for user data. The request may be in the form of a prompt on the page of the website, a log-in component, or the like. The user data may include data indicative of a user time zone, a unique user identifier, such as a username, personal identifying information, or the like. The server(s) 24 may be configured to receive the user data and select the video content files 32 based at least in part on the user time zone provided by the user through the user device 18. The video content files 32 may further be customized for the user based at least in part on the user data. In such embodiments, the content controller 30 may be configured to store the substantially random order in association with the user, such as in association with the unique user identifier on the database 26, and track on the database 26 which video content files 32 have been presented to the user.

The flow chart of FIG. 2 depicts the steps of an exemplary method 100 of providing unique content. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIG. 1. The steps of the method 100 may be performed by the system 10 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, the product and/or packaging with their respective codes are provided to the user. In one or more embodiments, the code of the product is concealed within the packaging with the packaging code being viewable outside of the packaging.

Referring to step 102, the camera or other sensor of the user device is used to capture at least a portion of one or both of the codes. In one or more embodiments, the codes are QR codes, and the camera of a smartphone is used to capture the one or both of the QR codes.

Referring to step 103, the URL(s) of the code(s) is extracted. For example, the user device may capture an image of one of the QR codes and/or encoded images and employ techniques known in the art to decode the QR codes (or encoded images) to determine the URL encoded therein. The URL may include an address for the main page or the demonstration page.

Referring to step 104, the request is received at the server. The request may be sent from the user device through the network to the server. Referring to step 105, this may include receiving user device data, including an IP address, cookies, such as one or more identifier of any previously viewed video content file, a page requested (such as the main page or the demonstration page), or the like.

Referring to step 106, a file stored on the database of the server is selected to be transmitted to the user for viewing. This step may include determining a number of files, such as video content files, classified for playing in the approximate time zone of the user device based on the user device IP address provided in the request. The video content files may also be selected based on what page is requested, such as the demonstration page or the main page. The video content files may then be organized in a substantially random order for viewing on the user device. The first video content file in the substantially random order is then transmitted by the server(s) to the user device through the network so that it is presented on the website page.

Referring to step 107, the user device downloads the website page with the video content file for viewing by the user.

In one or more embodiments, steps 104 through 107 can be repeated so that all the videos for a single day are viewed. Further, the steps may be repeated until the predefined day has been reached.

Referring to step 108, the method may additionally include a step of the user inputting user data into the user device. The user data may include data indicative of a user time zone, a unique user identifier, such as a username, personal identifying information, or the like. In one or more embodiments, this step is performed prior to step 106 so that the server can provide customized content for the user.

Referring to step 109, the user data is transmitted by the user device through the network to be received by the server. The server is configured to parse the user data.

Referring to step 110, the video content files for presenting on the user device is adjusted via the server based at least in part on the user data. In one or more embodiments, this step includes selecting, via the one or more servers, one or more video content files from the database based at least in part on the user data. The customized content files are then transmitted to the user device through the network.

Referring to step 111, the customized content is downloaded by the user device and displayed. Referring to step 112, the customized content is displayed on the user device.

The method 100 may include additional, less, or alternate steps and/or device(s), including those discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A computer-implemented method of providing unique content associated with a product, the computer-implemented method comprising:

providing a quick response (QR) code operatively associated with a product, wherein the QR code has encoded therein a uniform resource locator (URL) of a website, wherein the QR code is a first QR code located on a surface of the product;

receiving, via one or more servers, a request from a user device, the request including user device data including an internet protocol (IP) address and one or more identifier of any previously viewed video content file, wherein the user device data includes a page requested;

determining, via the one or more servers, an approximate geographic location of the user device based at least in part on the IP address;

determining, via the one or more servers, an approximated user time zone based at least in part on the approximate geographic location;

selecting, via the one or more servers, a plurality of video content files stored on a content database operatively associated with the one or more servers based at least in part on the approximated user time zone, wherein the plurality of video content files stored on the content database is based at least in part on the page requested;

generating, via the one or more servers, a substantially random order for displaying the plurality of video content files;

determining, via the one or more servers, a selected video content file of the plurality of video content files based at least in part on the substantially random order and the one or more identifier of any previously viewed video content file;

transmitting, via the one or more servers, the selected video content file; and providing a second QR code located on a packaging of the product that is different than the first QR code, wherein the first QR code has encoded therein a main page as the page requested, the second QR code has encoded therein a demonstration page as the page requested, and the first QR code is not visible when the product is in the packaging.

2. The computer-implemented method of claim 1, wherein determining, via the one or more servers, the selected video content file comprises comparing the identifier of any previously viewed video content file with an identifier of a video content file of the plurality of video content files at a beginning of the substantially random order.

3. The computer-implemented method of claim 2, further comprising:

determining the identifier of any previously viewed video content file is the same as the identifier of a video content file of the plurality of video content files at a beginning of the substantially random order; and comparing the identifier of any previously viewed video content file with an identifier of a subsequent video content file of the plurality of video content files according to the substantially random order.

4. The computer-implemented method of claim 1, wherein the plurality of video content files stored on the content database include classifiers associated with a number of days remaining until a predefined date.

5. A system for providing unique content associated with a product, system comprising:

a quick response (QR) code with a uniform resource locator (URL) of website encoded in the QR code located on the product;

one or more servers operatively associated with the website, the one or more servers including a content database and being configured to:

receive a request from a user device, wherein the request includes user device data including an internet protocol (IP) address and one or more identifier of any previously viewed video content file, determine an approximate geographic location of the user device based at least in part on the IP address, determine an approximated user time zone based at least in part on the approximate geographic location, select a plurality of video content files stored on the content database based at least in part on the approximated user time zone, generate a substantially random order for displaying the plurality of video content files, determine a selected video content file of the plurality of video content files based at least in part on the substantially random order and the one or more identifier of any previously viewed video content file by comparing an identifier associated with the selected video content file with the one or more identifier of any previously viewed video content file to ensure that the selected video content file has not already been viewed, and transmit the selected video content file, wherein the user device data includes a page requested, the QR code is a first QR code located on a surface of the product with a main page encoded therein as the page requested, the one or more servers, when selecting the plurality of video content files stored on the content database, are configured to select the plurality of videos based at least in part on the page requested; and packaging enclosing the product so that the first QR code is not visible outside the packaging, wherein a second QR code encoded with a demonstration page as the page requested is located on the packaging, wherein the demonstration page is different than the main page and the second QR code is different than the first QR code.

6. A computer-implemented method of providing unique content associated with an ornament, the computer-implemented method comprising:

providing an ornament quick response (QR) code located on the ornament, wherein the QR code has encoded therein a uniform resource locator (URL) of a website;

receiving, via one or more servers, a first user request from a user device;

transmitting, via the one or more servers, a request for user data including data indicative of a user time zone and a unique user identifier;

receiving, via the one or more servers, the user data;

selecting, via the one or more servers, a plurality of video content files stored on a content database operatively associated with the one or more servers based at least in part on the user time zone;

generating, via the one or more servers, a substantially random order for displaying the plurality of video content files;

storing, via the one or more servers, the substantially random order in association with the unique user identifier on a user database;

determining, via the one or more servers, a first selected video content file of the plurality of video content files based at least in part on the substantially random order;

transmitting, via the one or more servers, the first selected video content file;

storing, via the one or more servers, an identifier of the first selected video content file in association with the unique user identifier on the user database, wherein the URL is of a main page of the website;

providing a demonstration QR code located on a packaging of the ornament, wherein the demonstration QR code has encoded therein a URL of a demonstration page of the website that is different than the main page, the ornament QR code is not visible when the ornament is in the packaging, and the ornament QR code is different than the demonstration QR code;

receiving, via one or more servers, a second user request from the user device;

determining, via the one or more servers, a second selected video content file of the plurality of video content files based at least in part on the substantially random order and the identifier of the first selected video content file, the second selected video content file being different than the first selected video content file;

transmitting, via the one or more servers, the second selected video content file; and storing, via the one or more servers, an identifier of the second selected video content file in association with the unique user identifier on the user database.

7. The computer-implemented method of claim 6, wherein the substantially random order is determined via a pseudorandom number generator.

8. The computer-implemented method of claim 6, further comprising transmitting, via the one or more server, a demonstration video content file.

* * * * *